United States Patent
Gubler et al.

(10) Patent No.: US 11,739,433 B2
(45) Date of Patent: Aug. 29, 2023

(54) METHOD FOR REMOVING NON-PROTON CATIONIC IMPURITIES FROM AN ELECTROCHEMICAL CELL AND AN ELECTROCHEMICAL CELL

(71) Applicant: PAUL SCHERRER INSTITUT, Villigen (CH)

(72) Inventors: Lorenz Gubler, Untersiggenthal (CH); Pierre Boillat, Zurich (CH); Ugljesa Babic, Baden (CH); Mateusz Zlobinski, Kraszew (PL)

(73) Assignee: Paul Scherrer Institut, Villigen (CH)

( * ) Notice: Subject to any disclaimer, the term of this patent is extended or adjusted under 35 U.S.C. 154(b) by 154 days.

(21) Appl. No.: 17/279,725

(22) PCT Filed: Aug. 27, 2019

(86) PCT No.: PCT/EP2019/072776
§ 371 (c)(1),
(2) Date: Mar. 25, 2021

(87) PCT Pub. No.: WO2020/064241
PCT Pub. Date: Apr. 2, 2020

(65) Prior Publication Data
US 2022/0033986 A1    Feb. 3, 2022

(30) Foreign Application Priority Data
Sep. 25, 2018 (EP) .................................. 18196579

(51) Int. Cl.
*C25B 15/08* (2006.01)
*C25B 11/032* (2021.01)
(Continued)

(52) U.S. Cl.
CPC .............. *C25B 15/085* (2021.01); *C25B 1/04* (2013.01); *C25B 9/19* (2021.01); *C25B 11/032* (2021.01); *C25B 13/00* (2013.01)

(58) Field of Classification Search
CPC .................................... C25B 1/04; C25B 9/23
See application file for complete search history.

(56) References Cited

U.S. PATENT DOCUMENTS

| 4,381,230 A | 4/1983 | Burney, Jr. et al. |
| 5,277,768 A | 1/1994 | Twardowski |

(Continued)

FOREIGN PATENT DOCUMENTS

JP    2004-256911 A    *    9/2004

OTHER PUBLICATIONS

Xu et al., The effects of ionomer content on PEM water electrolyser membrane electrode assembly performance, International Journal of Hydrogen Energy, vol. 35, No. 21, Nov. 2010, pp. 12029-12037 (Year: 2010).*

(Continued)

*Primary Examiner* — Harry D Wilkins, III
(74) *Attorney, Agent, or Firm* — Laurence A. Greenberg; Werner H. Stemer; Ralph E. Locher

(57) ABSTRACT

Non-proton cationic impurities are removed from the ionomer in a proton exchange membrane of an electrochemical cell and from the anode side and cathode side catalyst layers. A supply path for an anode feed to the ionomer on the anode side of the proton exchange membrane and a supply path for a cathode feed to the ionomer on the cathode side of the proton exchange membrane are provided. A regenerating fluid with acidic pH is brought into contact with the ionomer on the cathode side of the proton exchange membrane to accomplish an ion exchange of the non-proton cationic impurities with protons and thus remove the non-proton (Continued)

cationic impurities from the ionomer into the regenerating fluid. This removes the non-proton cationic impurities from the ionomer of the electrochemical cell without increasing the risk of corrosion and without interrupting the process of the electrochemical cell.

11 Claims, 3 Drawing Sheets

(51) Int. Cl.
*C25B 9/19* (2021.01)
*C25B 1/04* (2021.01)
*C25B 13/00* (2006.01)

(56) References Cited

U.S. PATENT DOCUMENTS

| | | | |
|---|---|---|---|
| 7,491,302 B2* | 2/2009 | Sawamoto | C25B 1/13 |
| | | | 204/263 |
| 11,255,020 B2* | 2/2022 | Ono | C25B 15/08 |
| 11,293,109 B2* | 4/2022 | Ono | C25B 9/19 |
| 2003/0068544 A1 | 4/2003 | Cisar et al. | |
| 2006/0286429 A1 | 12/2006 | Shiepe et al. | |
| 2013/0146470 A1 | 6/2013 | Wang et al. | |
| 2015/0083607 A1 | 3/2015 | Gilliam et al. | |
| 2018/0274109 A1* | 9/2018 | Kudo | C25B 1/04 |

OTHER PUBLICATIONS

Machine translation of Horiguchi JP 2004-256911 A (Year: 2004).*

* cited by examiner

Anodic reaction $H_2O \rightarrow H^+ + \frac{1}{2}O_2(g)$ (1.23 V vs RHE)

Cathodic reaction $2H^+ \rightarrow H_2(g)$ (0 V vs RHE)

Overall reaction $H_2O \rightarrow H_2(g) + \frac{1}{2}O_2(g)$

METHOD FOR REMOVING NON-PROTON CATIONIC IMPURITIES FROM AN ELECTROCHEMICAL CELL AND AN ELECTROCHEMICAL CELL

BACKGROUND OF THE INVENTION

Field of the Invention:

The present invention relates to a method to remove non-proton cationic impurities from a ionomer associated with a proton exchange membrane comprised in an electrochemical cell and an electrochemical cell having capabilities for the removal of non-proton cationic impurities from a ionomer associated with a proton exchange membrane.

The proton exchange membrane water electrolyser (PEMWE) is an electrochemical device where the electrodes are separated by a solid proton conducting polymer membrane. On the anode side water is split into oxygen and protons. Protons are transported to the cathode side under the influence of the electric field where molecular hydrogen is evolved. Any other cation contaminants in the feed water can block cation exchange sites of the ionomer and impede proton transport and thus increase the ohmic resistance of the electrolyte, thereby reducing the efficiency of the water splitting reaction and increasing the operational costs.

Water electrolysis has a potential to be a key technology in the energy transition from the traditional fossil-based to the renewable, carbon-free systems. Power supply based on a significant share of these "new renewables" is associated with large discrepancies between supply and demand, owing to the intermittent nature of these primary energy sources. Water electrolysis is a clean and efficient process which offers strong prospects to store large amounts of excess electricity in form of chemical energy ('power-to-gas'). It is also a key component in coupling different sectors (electricity, mobility, heating) through the power-to-x concept. A PEMWE cell comprises of a positive electrode for the oxygen evolution reaction (OER), negative electrode for the hydrogen evolution reaction (HER) and a separator which electronically insulates the electrodes and prevents the cross-mixing of evolved gases, while allowing proton transport. State-of-the-art membrane water electrolyzers use a proton exchange membrane and, owing to the thin polymer electrolyte (~0.2 mm) with low ohmic resistance, can operate at relatively high current densities (1-3 A/cm$^2$) and differential pressures. The OER is catalysed by precious metals such as Ir and Ru due to their activity and stability in acidic medium. The most common catalyst for the HER in PEMWE is Pt.

The most important performance indicator measured in an operating electrolyzer is the current-voltage characteristics, normally referred to as a polarization curve. The main contribution to the polarization resistance at high current densities (>1 A cm$^{-2}$) stems from the ionic conduction through the ionomer network of the catalyst coated membrane. Ionic losses can be minimized by using a thinner polymer membrane and optimizing the catalyst layer structure for better ionic transport. The presence of non-proton ionic species in the ionomer lowers the voltage efficiency of the electrolyzer, thereby increasing the operating costs related to the price of electricity. Metal cations have a lower mobility than the proton (especially multivalent cations which are the most common contaminants) and require more electrical work to be transported through the ionomer. Furthermore, metallic cations form complex clusters with the electroosmotically dragged water that diffuses slower and affects the vehicular transport regime in the hydrophilic domain of the ionomer. The emission of metallic cations from the system and stack components (porous transport layers (PTLs), flow fields (FF) and bipolar plates (BP), pumps, piping) can lead to the loss in performance of the electrolyzer, even when the system is fed with deionized water. The most common ionic contaminants are coming from the insufficiently deionized water containing $Na^+$, $K^+$, $Ca^{2+}$, $Mg^{2+}$, etc., and structural components of the electrolyzer ($Fe^{3+}$, $Ti^{2+}$, $Cu^{2+}$) in contact with the feed water. Among these, $Fe^{3+}$ has the largest impact on the electrolyzer lifetime, as it catalyses the formation of radicals (Fenton reaction) which attack the ionomer backbone and lead to the decomposition of the polymer.

The main indicator of the ionically contaminated membrane is decreased voltage efficiency. If the cell is operated for a prolonged period of time with the ionic contaminants in the catalyst coated membrane (CCM), the ionic species will be transported under the effect of the electric field to the ionomer of the cathode catalyst layer, affecting the transport resistance in that area. If the electrolyzer undergoes a prolonged shutdown, the ionic species will diffuse into the bulk of the catalyst coated membrane and result in a significant increase of the ohmic resistance. The distribution of the ionic contaminants across the CCM is relevant for the regeneration strategy, as it can greatly simplify the technical implementation of the regenerating medium.

Severe ionic contamination has been identified as the main failure mode for commercial electrolyzer stacks. The cation contaminants in the feed-water can be scavenged using an ion-exchanger, prolonging the lifetime of the catalyst-coated membrane. Presence of the previously mentioned metals has been detected post-mortem in the electrolyzer CCMs, even if an ion-exchanger had been implemented to purify the feed water. The electrolyzer operation can be stopped and the CCM can be disassembled from the electrolyzer stack and reprotonated in an acidic medium to remove the metallic impurities. So far, the regeneration of the ionomer has been realized by circulating various acids in the anode water pumping loop. The contact of the acid with the piping can in this case lead to corrosion and therefore release of additional metal cations into the system, thereby re-contaminating the loop and ultimately the membrane.

Therefore, the cationic contamination of the solid electrolyte is a most common failure mode in industrial electrolyzer stacks.

SUMMARY OF THE INVENTION

It is therefore the objective of the present invention to provide a method and an electrochemical cell which allow to achieve a purification of the ionomer associated with the proton exchange membrane causing less corrosion and other collateral effects to the electrochemical cell.

With respect to the method, this objective is achieved according to the present invention by a method to remove non-proton cationic impurities from the ionomer comprised in a proton exchange membrane and the respective anode and cathode catalyst layer of an electrochemical cell, comprising the steps of:

a) providing a supply path for a anode feed to the ionomer on the anode side of the proton exchange membrane;

b) providing a supply path for a cathode feed to the ionomer on the cathode side of the proton exchange membrane; and c) bringing a regenerating fluid with acidic pH in contact to the ionomer on the cathode side of the proton exchange membrane to accomplish an ion exchange of the non-proton cationic impurities with protons and thus remove the non-proton cationic impurities from the ionomer into the regenerating fluid.

With respect to the electrochemical cell, this objective is achieved according to the present invention by an electrochemical cell, preferably a proton exchange membrane water electrolyzer, comprising:

a) a proton exchange membrane and the respective anode side and cathode side catalyst layer, comprising an ionomer in order to provide an ionic phase throughout the electrochemical cell;

b) a supply path for a anode feed to the ionomer on the anode side of the proton exchange membrane;

c) a supply path for a cathode feed to the ionomer on the cathode side of the proton exchange membrane; and d) an apparatus for bringing a regenerating fluid with acidic pH in contact to the ionomer on the cathode side of the proton exchange membrane to accomplish an ion exchange of the non-proton cationic impurities with protons and thus remove the non-proton cationic impurities from the ionomer into the regenerating fluid and for extracting the regenerating solution comprising the non-proton cationic impurities from the ionomer load.

These measures allow to remove the non-proton ionic impurities from the ionomer of the electrochemical cell without increasing the risk of corrosion and without an interruption of the process of the electrochemical cell.

Herein, the ionomer is representatively mentioned for any ionomer content which is used for the polymer electrolyte membrane and in the catalyst layer on the anode and the cathode side of the electrochemical cell in order establish a proper electrical, chemical and mechanical environment on the anode side and the cathode side of the polymer electrolyte membrane for the respective oxidation and/or reduction reactions which take place on the anode side and the cathode side of the polymer electrolyte membrane.

A preferred embodiment of the method provides for bringing a regenerating fluid with acidic pH in contact to the ionomeron the anode side of the proton exchange membrane to accomplish an ion exchange of the non-proton ionic impurities with protons and thus remove the non-proton ionic impurities from the ionomer load into the regenerating fluid.

Preferably, the acidification of the regenerating solution is accomplished by injecting acid, such as sulfuric, nitric, carbonic and/or hydrochloric acid, into an aqueous cathode feed and optionally into an aqueous anode feed.

For example, the acidification of the regenerating solution can be accomplished by introducing carbon dioxide $CO_2$ to the aqueous cathode feed triggering the formation of carbonic acid wherein optionally the aqueous cathode feed is looped.

In a further preferred embodiment of the present invention, the regenerating solution can be either discarded after the regeneration process, or restored by acid refilling or by passing it through an ion exchange bed to scavenge non-proton cations and maintain the acidic pH for recirculation.

In order to avoid an interruption of the operation of the electrochemical cell, the regenerating solution can be introduced as the aqueous cathode feed to the ionomer load on the cathode side of the proton exchange membrane of the operating electrochemical device.

One preferred option can be realized when the carbon dioxide $CO_2$ is used to acidify the regenerating solution and form carbonic acid at process pressure and temperature favourable for increasing the solubility of carbon dioxide $CO_2$ in the regenerating solution.

Another preferred option can be realized when the carbon dioxide $CO_2$ is dissolved in water in a mixing chamber external to the electrochemical device, in order to produce a regenerating solution which is fed to the electrochemical device.

Another preferred option can be realized when the carbon dioxide $CO_2$ is fed as a gas to the electrochemical device, and is dissolved in water inside the electrochemical device in order to produce the regenerating solution.

Alternatively, the carbon dioxide $CO_2$ is fed as a gas to the ionomer on the cathode side of the operating electrochemical cell and wherein the carbon dioxide is dissolved in water transported to the cathode side by electroosmotic drag.

Preferably, the electrochemical device can be operated as a proton exchange membrane water electrolyzer.

In order to properly guide aqueous fluids and gaseous fluids, the gas diffusion layers may comprise areas with modified water management properties. In addition or alternatively, separated gas and water transport pathways can be created in the gas diffusion layer by modifying the mechanical structure of the porous gas diffusion layers.

In particular, separated gas and water transport pathways can be created in the gas diffusion layer by establishing localized changes in the hydrophilicity. For example, specific regions of the gas diffusion layers can comprise grafted monomers that have a high or a low hydrophilicity.

BRIEF DESCRIPTION OF THE SEVERAL VIEWS OF THE DRAWING

Preferred embodiments of the present invention are hereinafter explained in more detail with reference to the attached drawings which depict in.

DETAILED DESCRIPTION OF THE INVENTION

Figure 1:
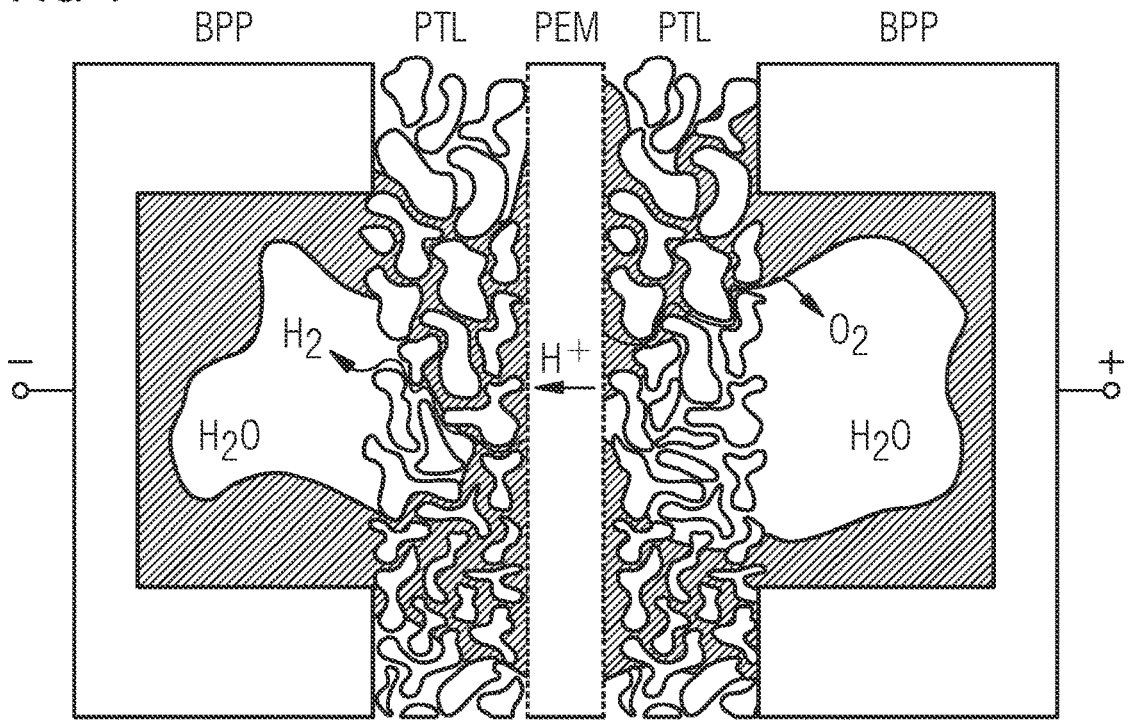
FIG. 1 a schematic representation of a PEMWE cell cross-section, and the electrochemical reactions taking place at the anode and cathode catalyst, including the overall water splitting reaction.
Figure 2:
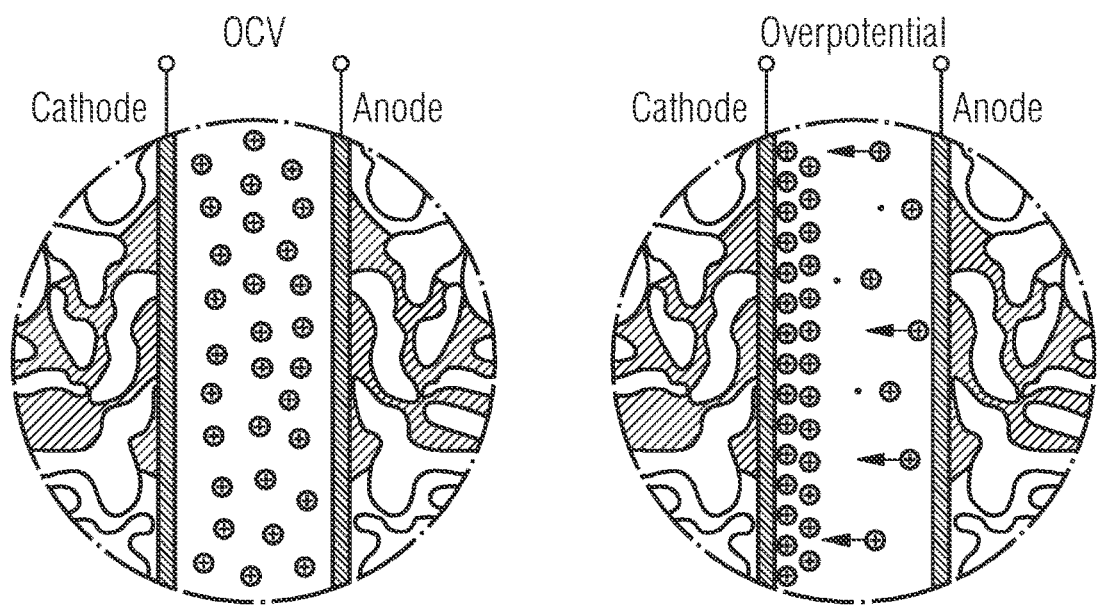
FIG. 2 a schematic representation of the operating cell voltage (left) and the overpotential situation.

The invention introduced here presents a viable way of operando regeneration of proton exchange membrane water electrolysers by extracting the contaminants from the electrolyte on the cathode side. The presented solution provides a way to achieve the reprotonation of the ion-exchange groups in the electrolyte during the operation of the device by indirectly forming an acidic environment in the cell, bypassing possible problems with corrosion of the system components. Further, the invention presents a viable way of operando regeneration of the electrolyzer CCM without the necessity of stopping the stack operation and component disassembly. FIG. 1 shows schematically a representation of a PEMWE cell cross-section, and the electrochemical reactions taking place at the anode and cathode catalyst, including the overall water splitting reaction. FIG. 2 shows the problem of the overvoltage having a negative impact on the cell performance.

During operation, the cationic species in the ionomer will move towards the negative electrode (cathode), and accumulate in the cathodic region of the catalyst coated membrane (CCM) which in general comprises an ionomer comprising the catalyst that is deposited on the polymer electrolyte membrane. In order to get rid of cations from the CCM it is necessary to introduce a counter ion which will attract the cationic contaminants from the ionomer and bind them. It is proposed here to saturate the cathode water recirculation loop with $CO_2$, which will lead to the formation of carbonic acid ($H_2CO_3$). Another possible embodiment is the feeding of pure CO2 to the cathode compartment at pressure.

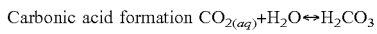
Carbonic acid formation $CO_{2(aq)} + H_2O \leftrightarrow H_2CO_3$

Carbonic acid may deprotonate and decrease the pH of the water in the cathode cell compartment and form bicarbonates, facilitating the ion-exchange with the contaminants.

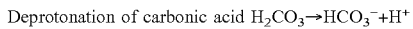
Deprotonation of carbonic acid $H_2CO_3 \rightarrow HCO_3^- + H^+$

Since the metallic contaminants are accumulated at the cathode, they will undergo an ion-exchange process and thus the metal ion will be removed from the ionomer:

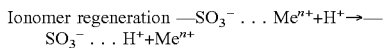
Ionomer regeneration $—SO_3^- \ldots Me^{n+} + H^+ \rightarrow —SO_3^- \ldots H^+ + Me^{n+}$ where $—SO_3^- \ldots Me^{n+}$ indicates a metal cation $Me^{n+}$ counter-ion in the ionomer with sulfonate anion fixed groups. The solubility of $CO_2$ is relatively low (around 0.005% molar fraction of $CO_2$ in liquid phase) at normal conditions. Therefore, the regeneration should be done at elevated pressures and low temperatures allowing the decrease of the pH value of the exchange solution significantly. For example, a system of carbon dioxide and water at 35° C. and 4 bar has been demonstrated to yield a pH of approximately 3.7. Increasing the pressure to 150 bar at the same temperature would result in a more acidic solution with a pH of approximately 3. State-of-the-art electrolyzer membranes are around 0.2 mm thick, and allow a safe differential operation at pressures in the range of 50 to 100 bar, thereby making the regeneration solution viable in a technical system. The cathodic recirculation loop can be additionally equipped with a heat exchanger to reduce the temperature of the solution below ambient temperature and decrease the pH even further.

Figure 3:
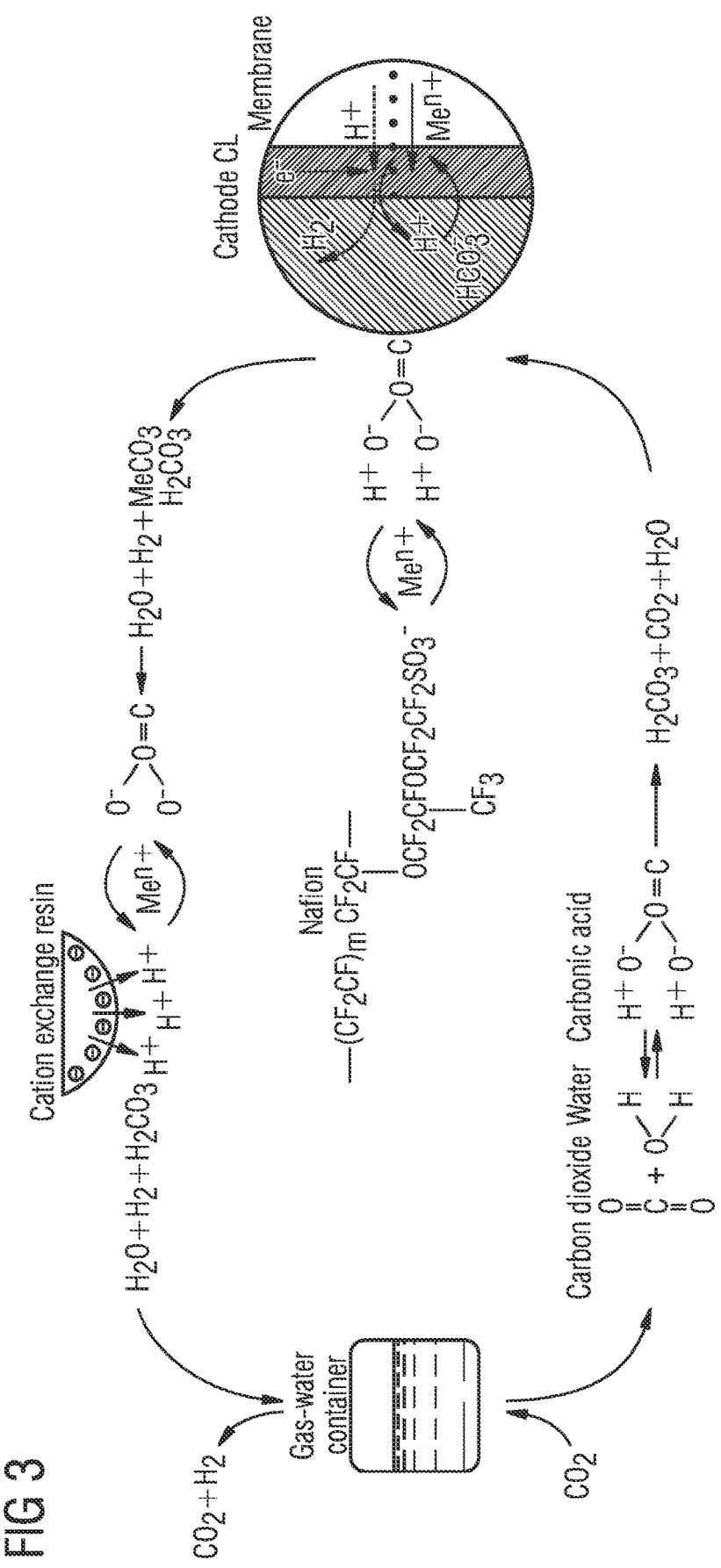
FIG. 3 a schematic representation of the PEMWE ionomer regeneration procedure in the cathodic water recirculation loop.
Figure 4:
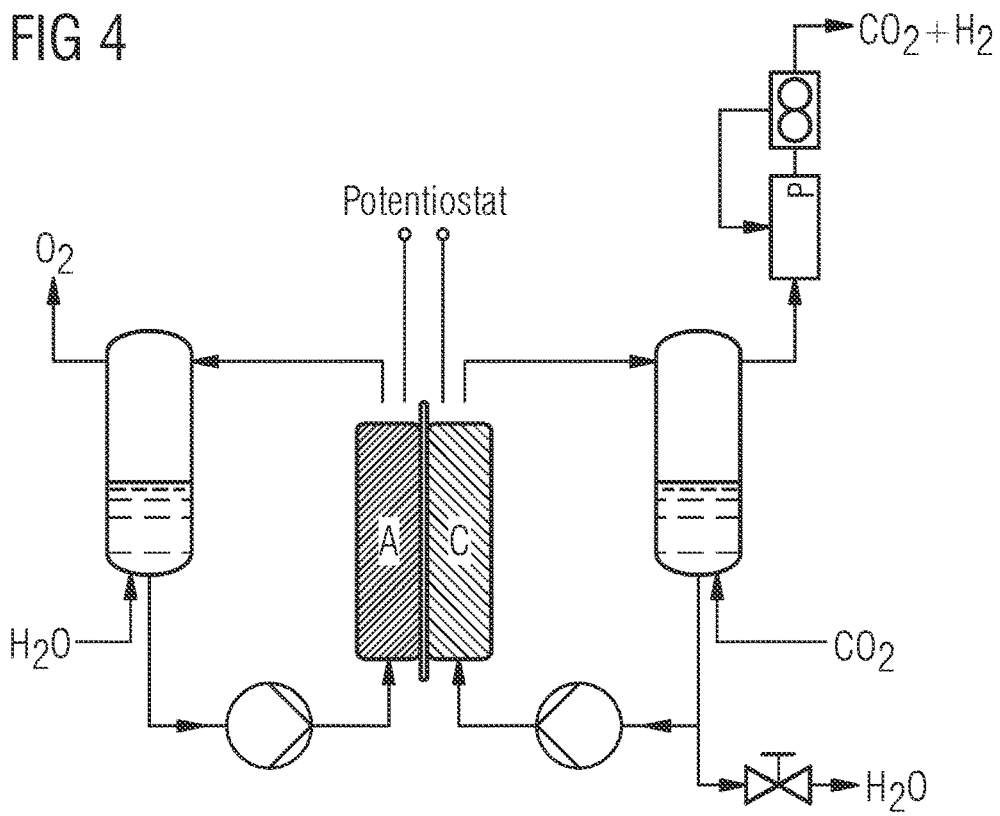
FIG. 4 a schematic representation of the a PEMWE electryser cell including regeneration circuits for the regeneration of the cathionic ionomer load.

As the water in the regeneration loop is diluted with the electro-osmotically dragged water and saturated with metal bicarbonates, a cation exchange resin can be optionally introduced in the regeneration loop to scavenge the metallic species and protonate the solution to maintain the pH. A schematic of an electrolyzer system equipped with the cathodic regeneration process in outlined in FIG. 4. The anode compartment, which is more sensitive to impurities and contains particularly expensive components, would be unaffected. The proposed regeneration solution involves introducing agents on the cathode side alone, which will not disturb normal operation of the stack. FIG. 3 shows a schematic representation of the PEMWE ionomer regeneration procedure in the cathodic water recirculation loop.

The proposed method of regenerating the performance of the contaminated electrolyzer CCM has been tested using a system equipped with a peristaltic pump for the recirculation of the feed, contamination and the regeneration solution through a PEMWE cell, a mass flow meter and a pressure controller to regulate the cathodic process parameters, and a laboratory potentiostat to drive the water splitting reaction and measure the polarization curve.

Figure 5:
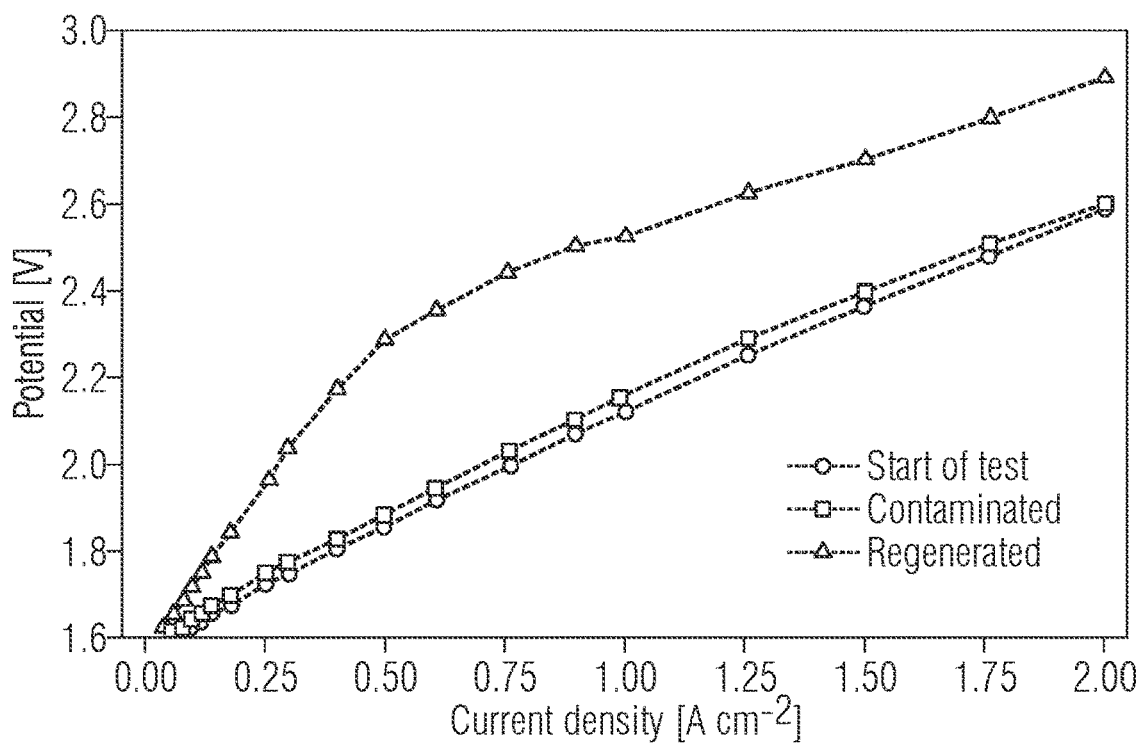
FIG. 5 polarization curves of a pristine, contaminated and a regenerated electrolyzer measured at 40° C. and ambient pressure.

After the conditioning of the cell and the baseline measurements, the electrolyzer was contaminated with a 2 mM $FeSO_4$ solution introduced into anode feed water loop for 60 min. The effect on the polarization curve is shown in FIG. 5. The anodic loop of the electrolyzer was then replaced with fresh miliQ water to avoid further contamination, and polarization data was collected after the potential had stabilized. The cathodic loop was connected to the $CO_2$ feed and pressurized to 21 bar. The temperature of the cathodic loop was kept at 30° C. $CO_2$ saturated regeneration solution was circulated through the cathodic cell compartment of an operating contaminated PEMWE cell at a flow rate of 600 mL/min. The PEMWE cell was operated at a current density of 1 A cm$^{-2}$ for 25 h during the regeneration process. The cathodic loop was afterwards purged and the polarization curves were recorded after stabilization of the cell potential. The regeneration yielded a ~98% restored voltage efficiency in the current density range of 1 to 2 A cm$^{-2}$. The approach is thereby validated for the pH controlling parameters (21 bar and 30° C.). FIG. 5 shows the respective polarization curves of a pristine, contaminated and a regenerated electrolyzer measured at 40° C. and ambient pressure.

The invention claimed is:

1. A method of removing non-proton cationic impurities from an ionomer associated with a proton exchange membrane and respective anode side and cathode side catalyst layers of an electrochemical cell, the method comprising the steps of:
   a) providing a supply path for an anode feed to the ionomer on the anode side of the proton exchange membrane;
   b) providing a supply path for a cathode feed to the ionomer on the cathode side of the proton exchange membrane; and
   c) bringing a regenerating fluid having an acidic pH in contact with the ionomer on the cathode side of the proton exchange membrane to cause an ion exchange of non-proton cationic impurities with protons and to remove the non-proton cationic impurities from the ionomer into the regenerating fluid; and
   acidifying the regenerating solution by introducing carbon dioxide $CO_2$ to an aqueous cathode feed triggering a formation of carbonic acid, and optionally looping the aqueous cathode feed.

2. The method according to claim 1, which comprises bringing a regenerating fluid with acidic pH in contact with the ionomer on the anode side of the proton exchange membrane to cause an ion exchange of the non-proton cationic impurities with protons and to remove the non-proton cationic impurities from the ionomer into the regenerating fluid.

3. The method according to claim 1, which comprises acidifying a regenerating solution by injecting acid into an aqueous cathode feed and optionally into an aqueous anode feed.

4. The method according to claim 3, which comprises acidifying the regenerating solution by injecting an acid selected from the group consisting of sulfuric acid, nitric acid, carbonic acid, and hydrochloric acid.

5. The method according to claim 1, which comprises discarding the regenerating solution after a regeneration process, or restoring the regenerating solution by acid refilling or by passing the regenerating solution through an ion exchange bed to scavenge non-proton cations and maintain the acidic pH for recirculation.

6. The method according to claim 1, which comprises introducing the regenerating solution into the ionomer on the cathode side of the proton exchange membrane while the electrochemical cell is operating.

7. The method according to according to claim 1, which comprises operating the electrochemical cell as a proton exchange membrane water electrolyzer.

8. A method of removing non-proton cationic impurities from an ionomer associated with a proton exchange membrane and respective anode side and cathode side catalyst layers of an electrochemical cell, the method comprising the steps of:
  a) providing a supply path for an anode feed to the ionomer on the anode side of the proton exchange membrane;
  b) providing a supply path for a cathode feed to the ionomer on the cathode side of the proton exchange membrane; and
  c) bringing a regenerating fluid having an acidic pH in contact with the ionomer on the cathode side of the proton exchange membrane to cause an ion exchange of non-proton cationic impurities with protons and to remove the non-proton cationic impurities from the ionomer into the regenerating fluid; and
  using carbon dioxide $CO_2$ to acidify the regenerating solution and form carbonic acid at a process pressure and a temperature favorable for increasing a solubility of carbon dioxide $CO_2$ in the regenerating solution.

9. A method of removing non-proton cationic impurities from an ionomer associated with a proton exchange membrane and respective anode side and cathode side catalyst layers of an electrochemical cell, the method comprising the steps of:
  a) providing a supply path for an anode feed to the ionomer on the anode side of the proton exchange membrane;
  b) providing a supply path for a cathode feed to the ionomer on the cathode side of the proton exchange membrane; and
  c) bringing a regenerating fluid having an acidic pH in contact with the ionomer on the cathode side of the proton exchange membrane to cause an ion exchange of non-proton cationic impurities with protons and to remove the non-proton cationic impurities from the ionomer into the regenerating fluid; and
  dissolving carbon dioxide $CO_2$ in water in a mixing chamber external to an electrochemical device having the electrochemical cell, in order to produce a regenerating solution which is fed to the electrochemical cell.

10. A method of removing non-proton cationic impurities from an ionomer associated with a proton exchange membrane and respective anode side and cathode side catalyst layers of an electrochemical cell, the method comprising the steps of:
  a) providing a supply path for an anode feed to the ionomer on the anode side of the proton exchange membrane;
  b) providing a supply path for a cathode feed to the ionomer on the cathode side of the proton exchange membrane; and
  c) bringing a regenerating fluid having an acidic pH in contact with the ionomer on the cathode side of the proton exchange membrane to cause an ion exchange of non-proton cationic impurities with protons and to remove the non-proton cationic impurities from the ionomer into the regenerating fluid; and
  feeding carbon dioxide $CO_2$ in gas phase to the electrochemical device, and dissolving the carbon dioxide $CO_2$ in water inside the electrochemical device in order to produce the regenerating solution.

11. A method of removing non-proton cationic impurities from an ionomer associated with a proton exchange membrane and respective anode side and cathode side catalyst layers of an electrochemical cell, the method comprising the steps of:
  a) providing a supply path for an anode feed to the ionomer on the anode side of the proton exchange membrane;
  b) providing a supply path for a cathode feed to the ionomer on the cathode side of the proton exchange membrane; and
  c) bringing a regenerating fluid having an acidic pH in contact with the ionomer on the cathode side of the proton exchange membrane to cause an ion exchange of non-proton cationic impurities with protons and to remove the non-proton cationic impurities from the ionomer into the regenerating fluid; and
  feeding carbon dioxide $CO_2$ in gas phase to the ionomer on the cathode side of the operating electrochemical cell and transporting the carbon dioxide $CO_2$, dissolved in water, to the cathode side by electroosmotic drag.

* * * * *